United States Patent
Lee et al.

(10) Patent No.: US 6,449,416 B1
(45) Date of Patent: Sep. 10, 2002

(54) DISPERSION SHIFTED OPTICAL FIBER AND METHOD OF FORMING THE SAME

(75) Inventors: Ji-Hoon Lee, Deagu; Mun-Hyun Do, Gumi, both of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/222,762

(22) Filed: Dec. 30, 1998

(30) Foreign Application Priority Data

Dec. 30, 1997 (KR) .............................. 97/77780
Nov. 4, 1998 (KR) .............................. 98/47134

(51) Int. Cl.$^7$ ................................................ G02B 6/22
(52) U.S. Cl. ........................................ 385/127; 385/126
(58) Field of Search ........................ 385/123, 124, 385/125, 126, 127, 128

(56) References Cited

U.S. PATENT DOCUMENTS

| | | |
|---|---|---|
| 4,447,127 A | 5/1984 | Cohen et al. |
| 4,465,334 A | 8/1984 | Siemsen et al. |
| 4,641,917 A | 2/1987 | Glodis et al. |
| 4,664,474 A | 5/1987 | Tanaka et al. |
| 4,715,695 A | 12/1987 | Nishimura et al. |
| 4,755,022 A | 7/1988 | Ohashi et al. |
| 4,820,018 A | 4/1989 | Melman et al. |
| 4,852,968 A | 8/1989 | Reed |
| 4,893,896 A | 1/1990 | Tanaka et al. |
| 5,115,486 A | 5/1992 | Bader et al. |
| 5,553,185 A | 9/1996 | Antos et al. |
| 5,559,921 A | 9/1996 | Terasawa et al. |
| 5,649,044 A | 7/1997 | Bhagavatula |
| 5,675,688 A | 10/1997 | Nouchi et al. |
| 5,703,986 A | 12/1997 | Brehm et al. |
| 5,729,645 A | 3/1998 | Garito et al. |
| 5,799,123 A | * 8/1998 | Oyobe et al. ............... 385/124 |
| 5,822,488 A | * 10/1998 | Terasawa et al. ........... 385/127 |
| 5,835,655 A | * 11/1998 | Liu et al. .................... 385/124 |
| 5,852,701 A | * 12/1998 | Kato et al. .................. 385/127 |

FOREIGN PATENT DOCUMENTS

| | | |
|---|---|---|
| EP | 0689068 A1 | 12/1995 |
| EP | 0789257 A1 | 8/1997 |
| JP | Hei 10-186156 | 7/1998 |

OTHER PUBLICATIONS

PCT International Preliminary Examination Report for application No. PCT/KR 98/00481 (4 pages).
Notice to Submit Response issued by Korean Industrial Property Office on Nov. 30, 2000 and it English Translation.
English Language translation of Japanese Patent Publication No. 10–186156 dated Jul. 14, 1998.

\* cited by examiner

*Primary Examiner*—Frank G. Font
*Assistant Examiner*—Roy M. Punnoose
(74) *Attorney, Agent, or Firm*—Robert E. Bushnell, Esq.

(57) ABSTRACT

A dispersion shifted optical fiber includes: a first core having a constant refractive index within a predetermined radius from the center of an optical fiber, a second core which covers the first core and has a refractive index which decreases from the refractive index of the first core with an increase in its radius, and a cladding which covers the second core and has a refractive index smaller than the minimum refractive index of the second core. Accordingly, the core structure of an optical fiber is controlled, and the optical fiber has a refractive index distribution being a complex of a staircase type having low dispersion and a triangular type having low loss, thus resulting in an optical fiber having low dispersion and low loss.

10 Claims, 5 Drawing Sheets

DISPERSION SHIFTED OPTICAL FIBER AND METHOD OF FORMING THE SAME

CLAIM OF PRIORITY

This application makes reference to, incorporates the same herein, and claims all benefits accruing under 35 U.S.C. §119 from an applications for SINGLE MODE OPTICAL FIBER earlier filed in the Korean Industrial Property Office on Dec. 30, 1997 and there duly assigned an Ser. No. 77780/1997, and for SINGLE MODE OPTICAL FIBER earlier filed in the Korean Industrial Property Office on Nov. 4, 1998 and there duly assigned Ser. No. 47134/1998.

BACKGROUND OF TEE INVENTION

1. Field of the Invention

The present invention relates to a dispersion shifted optical fiber, and more particularly, to a dispersion shifted optical fiber whose refractive index varies with the radius of a core.

2. Description of the Related Art

In general, an optical fiber for long-distance, superhigh-speed, and wide-band communications must have the characteristics of low loss, low dispersion, and low dispersion slope at wavelengths in use. An optical fiber having such characteristics is usually a dispersion shifted fiber or a non-zero dispersion shifted fiber. The distribution forms of the refractive indices of these fibers are changed into various structures to satisfy the aforementioned optical characteristics.

Such a change in the refractive index can be obtained by providing an annular region to a core whose refractive index varies in the shape of a triangle or allowing the core to have a double core structure corresponding to a convex type refractive index.

In conventional core arrangements, such as that disclosed in U.S. Pat. No. 5,553,185 to Antos et al., entitled Controlled Dispersion Optical Waveguide, the difference in refractive index between the cladding and the core is made larger by depressing the reflective index of an annular region adjacent to the core, thereby obtaining a low dispersion slope.

In order the widen the difference in refractive index between the core and the cladding, the refractive index of the cores increased or that of the cladding is depressed. However, in the first method, optical loss is increased by a dopant which is used to increase the refractive index, making it impossible to have a refractive index over a predetermined level.

In the second method, loss is suddenly increased in a long wavelength region by a depressed region. In order to solve this problem, the ratio of the radius of a cladding to that of the core must be large.

U.S. Pat. No. 4,447,127 to Cohen et al., entitled Low Loss Single Mode Fiber, discloses an arrangement in which the leakage loss depending on each wavelength of an optical fiber when the ratios between the radius of a cladding to that of a core are 6 and 7.

However, when a modified chemical vapor deposition is applied to the optical fiber manufacturing method as noted above, the conventional method still has problems in that it is difficult to manufacture an optical fiber preform having a large aperture and it takes a great deal of time to manufacture the optical fiber.

The following patents each discloses features in common with the present invention: U.S. Pat. No. 5,675,688 to Nouchi et al, entitled Dispersion-Shifted Monomode Optical Fiber, U.S. Pat. No. 5,799,123 to Oyobe et al, entitled Dispersion Compensating Fiber, U.S. Pat. No. 4,755,022 to Ohashi et al., entitled Zero Dispersion Single Mode Optical Fiber with Center Core And Side Core In The 1.5 $\mu$M Wavelength Region, U.S. Pat. No. 5,703,986 to Brehm et al., entitled Monomode Optical Fiber, U.S. Pat. No. 5,649,044 to Bhagavatula, entitled Dispersion Shifted Optical Waveguide, U.S. Pat. No. 4,820,018 to Melman et al., entitled Optical Fiber For Light Amplification, U.S. Pat. No. 4,852,968 to Reed, entitled Optical Fiber Comprising A Refractive Index Trench, U.S. Pat. No. 4,893,896 to Tanaka et al., entitled Energy Transmission Optical Fiber, U.S. Pat. No. 5,115,486 to Bader et al., entitled Flexible Optical Graded-Index Profile Fiber For Transmission Of Laser Radiation With High Output With Substantial Preservation Of The Mode Structure, U.S. Pat. No. 4,465,334 to Siemsen et al., entitled Multilayer Fiber Light Conductor, U.S. Pat. No. 4,664,474 to Tanaka et al., entitled Optical Fiber And Process For Producing The Same, U.S. Pat. No. 4,715,695 to Nishimura et al., entitled Fiber For Optical Transmission, U.S. Pat. No. 5,729,645 to Garito et al., entitled Graded Index Optical Fibers, and U.S. Pat. No. 4,641,917 to Glodis et al., entitled Single Mode Optical Fiber.

SUMMARY OF THE INVENTION

To solve the above problems, it is an object of the present invention to provide a dispersion shifted optical fiber whose refractive index varies to obtain low dispersion and low dispersion slope.

Accordingly, to achieve the above objective, there is provided a dispersion shifted optical fiber comprising: a first core having a constant refractive index within a predetermined radius from the center of an optical fiber; a second core which covers the first core and has a refractive index which decreases from the refractive index of the first core with an increase in its radius; and a cladding which covers the second core and has a refractive index smaller than the minimum refractive index of the second core.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
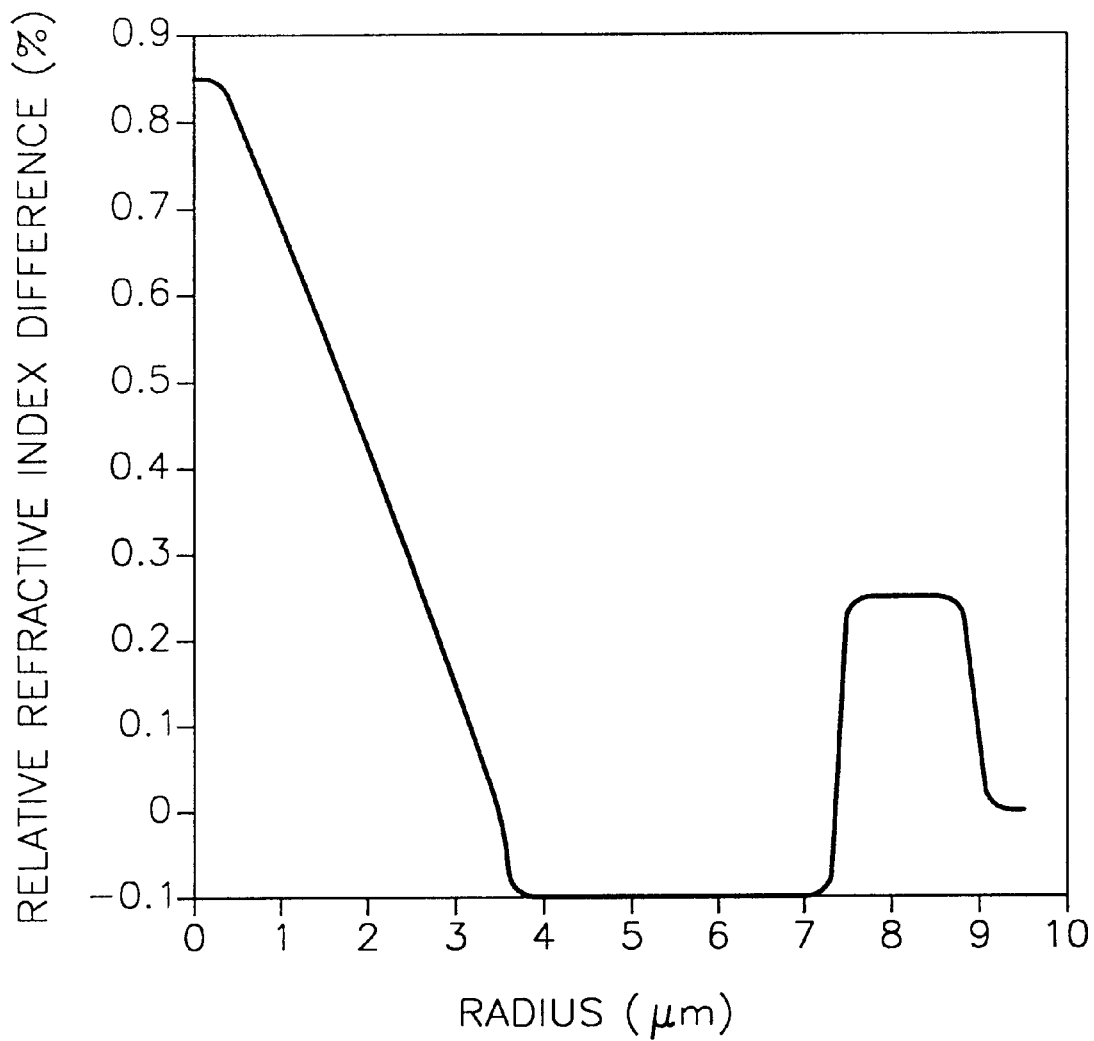
FIG. 1 is a graph showing a variation in the refractive index having a low dispersion slope according to the prior art.

FIG. 1 shows relative refractive index differences according to the radius of a conventional core which are disclosed in U.S. Pat. No. 5,553,185. Here, when $n_{co}$ is a maximum refractive index of a core, and $n_{cl}$ the refractive index of a cladding, the relative refractive index difference is expressed as $(n_{co}^2 - n_{cl}^2)/2n_{co}^2$. In this method, the difference in refractive index between the cladding and the core is made larger by depressing the refractive index of an annular region adjacent to the core, thereby obtaining a low dispersion slope.

In order to widen the difference in refractive index between the core and the cladding, the refractive index of the core is increased, or that of the cladding is depressed. However, in the first method, optical loss is increased by a dopant which is used to increase the refractive index, making it impossible to have a refractive index over a predetermined level. In the second method, loss is suddenly increased in a long-wavelength region by a depressed region. In order to solve this problem, the ratio of the radius of a cladding to that of a core must be large.

Figure 2:
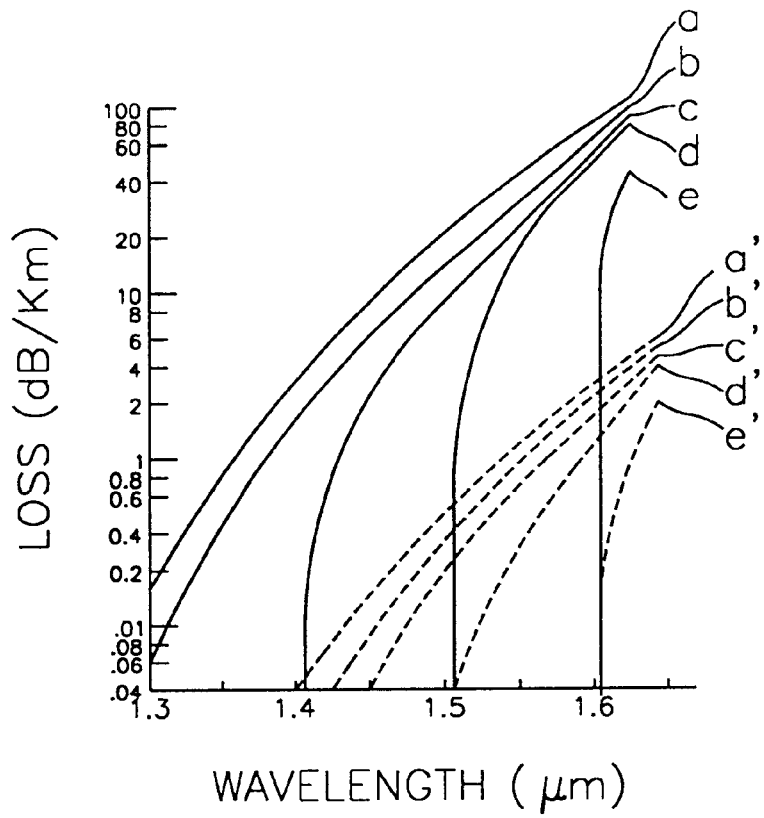
FIG. 2 is a graph showing leakage loss with respect to each wavelength of an optical fiber when the ratios of a cladding radius to a core radius are 6 and 7.

FIG. 2 shows leakage loss depending on each wavelength of an optical fiber when the ratios between the radius of a cladding to that of a core are 6 and 7, which is disclosed in U.S. Pat. No. 4,447,127. The solid line represents the case when a cladding-to-core diameter ratio is 6, and the dotted line represents the case when the cladding-to-core diameter ratio is 7. Here, a and a' each have a relative refractive index difference of 0, indicating that the refractive index of a cladding is the same as that of a core. b and b' each have a relative refractive index difference of 0.2, c and c' each have a relative refractive index difference of 0.23, d and d' each have a relative refractive index difference of 0.25, and e and e' each have a relative refractive index difference of 0.27.

However, when modified chemical vapor deposition (MCVD) is applied to the optical fiber manufacturing method as described above, this conventional method still has problems in that it is difficult to manufacture an optical fiber preform having a large aperture, and it takes a great deal of time to manufacture the optical fiber.

Figure 3:
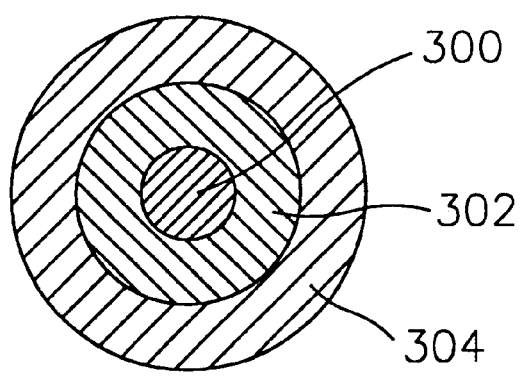
FIG. 3 is a cross-sectional view of a dispersion shifted optical fiber according to an embodiment of the present invention.
Figure 4:
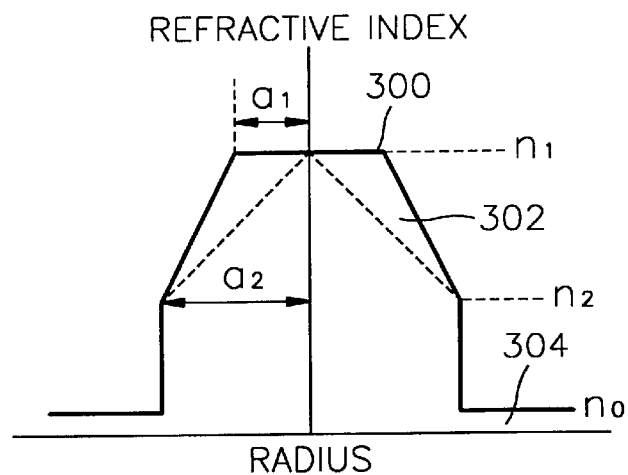
FIG. 4 shows the distribution of the refractive index of the optical fiber shown in FIG. 3.

Referring to FIG. 3, an optical fiber includes first and second cores 300 and 302, and a cladding 304. The distribution of the first and second cores 300 and 302 and the cladding 304 is shown in FIG. 4. That is, the refractive index of the first core 300 having a radius of $a_1$ from the center is constant as $n_1$. The refractive index of the second core 302 having a radius $a_2$ and covering the first core 300 linearly decreases from the refractive index $n_1$ of the first core to $n_2$. The refractive index of the cladding 304 is $n_0$ which is smaller than $n_2$. This distribution of refractive indices is a complex of a stepped refractive index distribution having low dispersion and a triangular refractive index distribution having low loss.

Figure 5A:
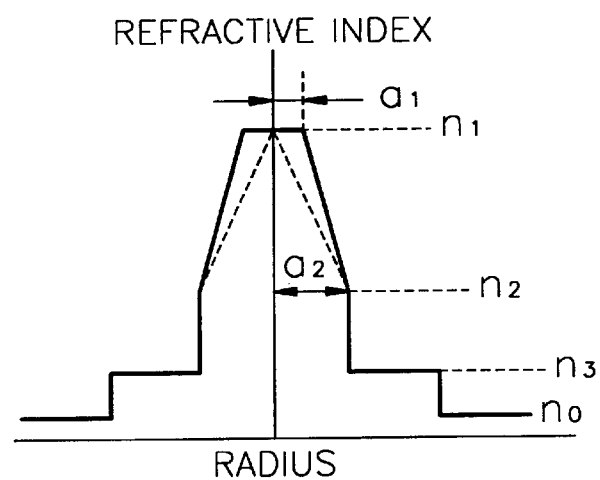
FIGS. 5A and 5B show the distribution of the refractive index of an optical fiber according to another embodiment of the present invention.
Figure 5B:
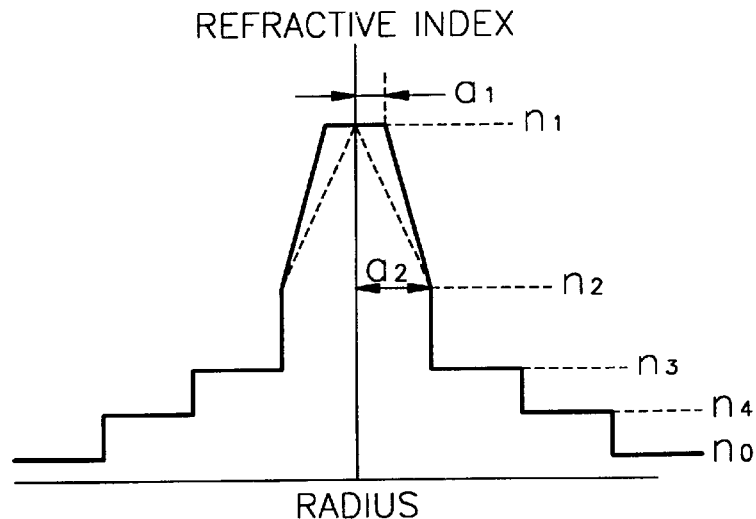

FIGS. 5A and 5B show the distributions of the refractive indices of optical fibers according to another embodiment of the present invention. The optical fiber of FIG. 5A further includes a third core in addition to the first and second core, and the optical fiber of FIG. 5B further includes a fourth core outside the third core of FIG. 5A. Here, the refractive index $n_3$ of the third core is smaller than a minimum refractive index $n_2$ of the second core, and the refractive index $n_4$ of the fourth core is smaller than the refractive index $n_3$ of the third core. Here, $n_3$ and $n_4$ are larger than $n_0$.

Figure 6:
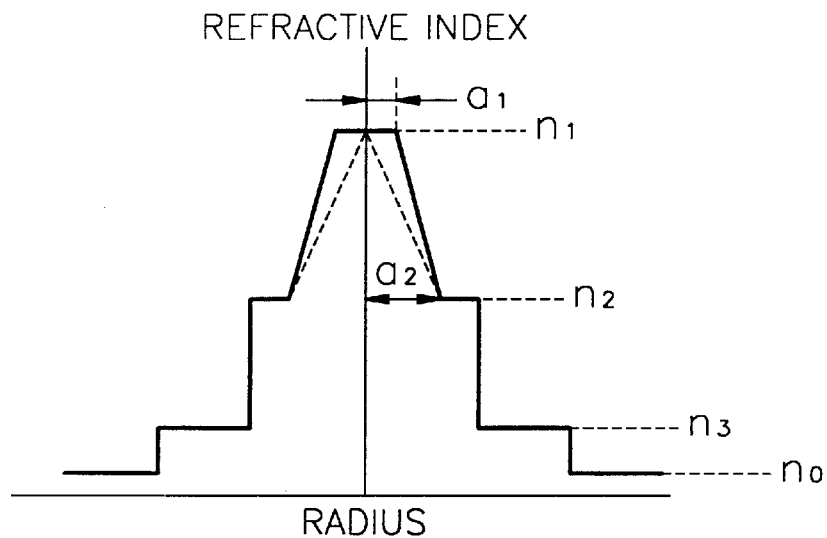
FIG. 6 shows the distribution of the refractive index of an optical fiber according to still another embodiment of the present invention.

FIG. 6 shows the distribution of the refractive index of an optical fiber according to still another embodiment of the present invention. The optical fiber of FIG. 6 further comprises third and fourth cores in addition to the first and second cores of FIG. 4. Here, the refractive index of the third core is $n_2$ which is equal to the minimum refractive index of the second core, and the refractive index of the fourth core is $n_3$ which is smaller than the refractive index $n_2$ of the third core and larger than the refractive index $n_0$ of a cladding.

FIGS. 7 through 10 show the correlation between the refractive index distribution and the structure for satisfying the optical characteristics of low dispersion, low dispersion slope, and low loss of the optical fiber having the above-described complex distribution of refractive indices.

Figure 7:
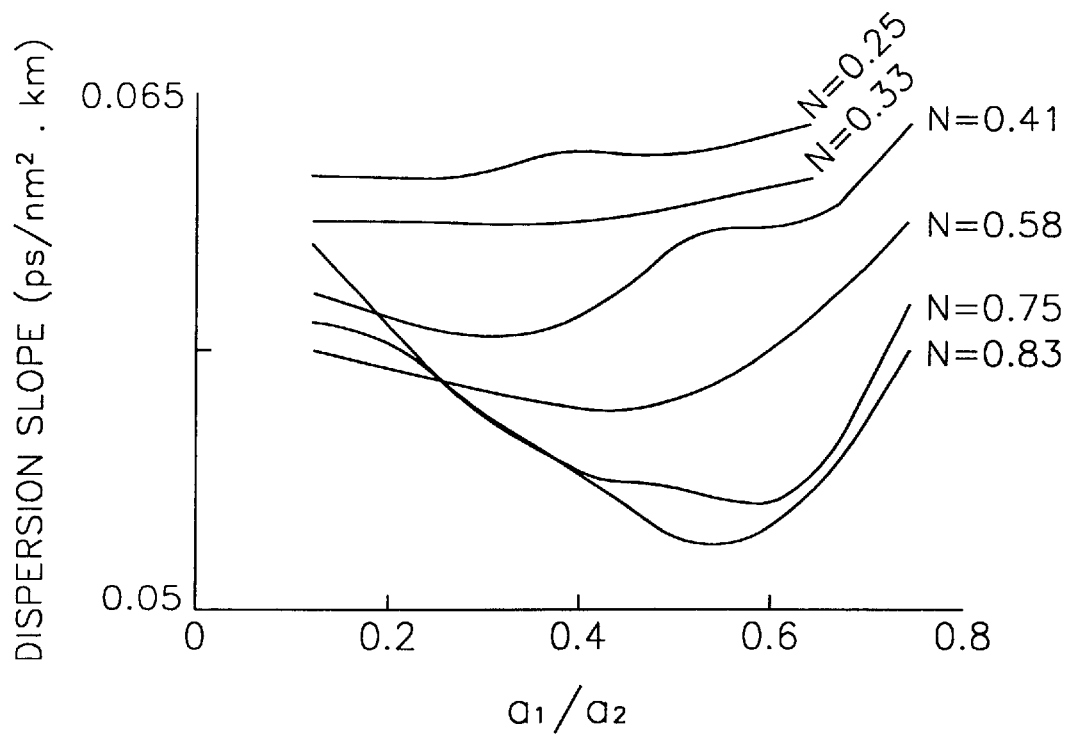
FIG. 7 is a graph showing a variation in dispersion slope with respect to a variation in $a_1/a_2$ of FIG. 4.

FIG. 7 is a graph showing a variation in dispersion slope with respect to a variation in $a_1/a_2$ of FIG. 4. Here, N is the result of an expression: $(R_1 - R_2)/R_1$, with $R_1$ being a relative refractive index difference of the first core and with $R_2$ being a relative refractive index difference of the second core, and with $R_1$ and $R_2$ each being respectively determined by an expression:

$$(n_{co}^2 - n_{cl}^2)/2n_{co}^2,$$

with $n_{co}$ being a maximum refractive index of the first core when determining $R_1$, with $n_{co}$ being a maximum refractive index of the second core when determining $R_2$, and with $n_{cl}$ being the refractive index of the cladding. The refractive index profile of cores approaches the shape of a triangle as N increases, or approaches the shape of a step as N decreases. According to what is shown in FIG. 7, when the refractive index $n_2$ is small, i.e., when N is large, if $a_1/a_2$ is small, i.e., the refractive index profile is triangular, the dispersion slope has a high value. On the other hand, when $a_1/a_2$ increases and reaches a predetermined value, the dispersion slope has the lowest value. Also, when the refractive index $n_2$ increases and becomes stepped, i.e., when N becomes smaller, the dispersion slope varies in a narrow range even when $a_1/a_2$ varies, and the dispersion slope becomes almost constant regardless of $a_1/a_2$. Thus, a small dispersion slope can be obtained in the N range of 0.2 to 0.85 and in the $a_1/a_2$ range of 0.7 or less. Also, an optimal small dispersion slope can be obtained by properly combining $n_1$, $n_2$, and $a_1/a_2$ with one another.

Figure 8:
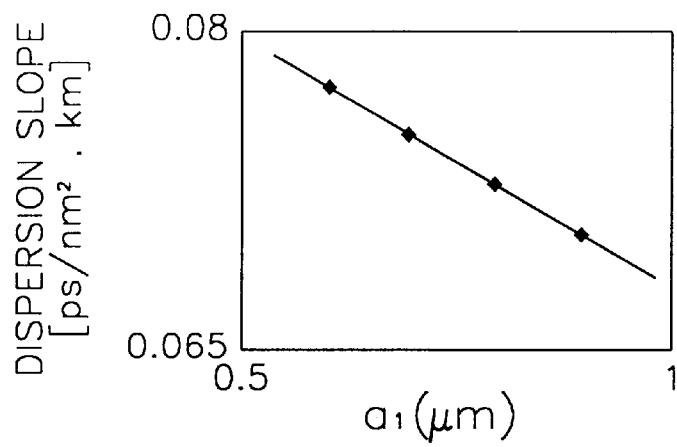
FIG. 8 shows a dispersion slope obtained by varying $a_1$ with $n_1$, $n_2$, and $a_2$ of FIG. 4 fixed.
Figure 9:
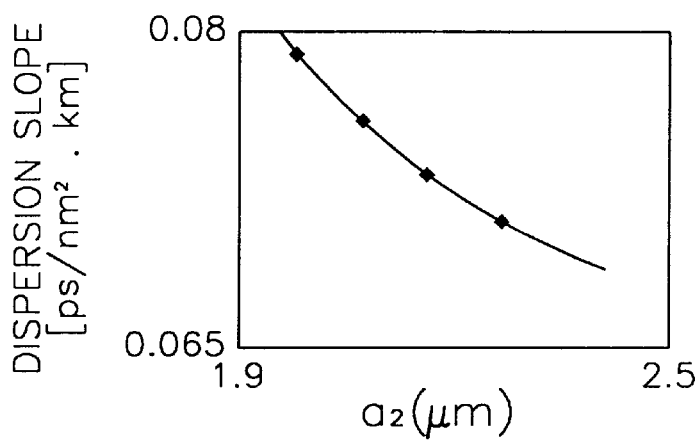
FIG. 9 shows a dispersion slope obtained by varying $a_2$ when $a_1/a_2$ of FIG. 4 is constant.
Figure 10:
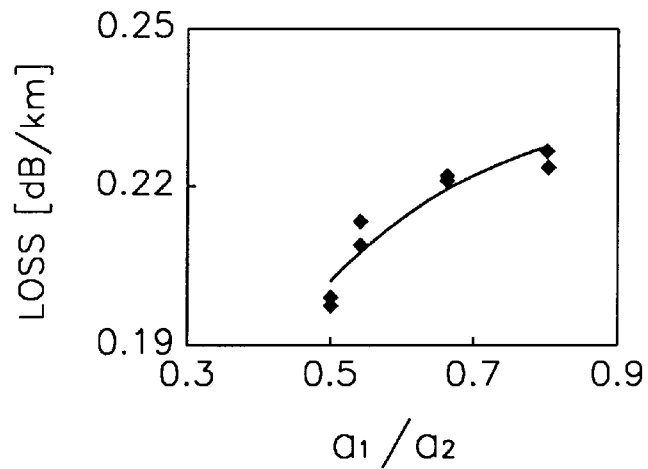
FIG. 10 shows loss in a wavelength of 1.55 μm depending on $a_1/a_2$ of FIG. 4.

FIGS. 8 through 10 show dispersion slopes obtained from embodiments of an optical fiber manufactured based on values given in FIG. 7.

FIG. 8 shows a dispersion slope obtained by varying $a_1$ with $n_1$, $n_2$, and $a_2$ of FIG. 4 fixed. FIG. 9 shows a dispersion slope obtained by varying $a_2$ when $a_1/a_2$ of FIG. 4 is constant.

FIG. 10 shows loss in a wavelength of 1.55 μm depending on $a_1/a_2$ of FIG. 4. Referring to FIG. 10, as $a_1/a_2$ becomes smaller, i.e., the refractive index profile becomes triangular shaped, the loss becomes small. As $a_1/a_2$ becomes larger, i.e., the refractive index profile becomes stepped, the loss becomes large. That is, the triangular-shaped refractive index distribution is preferable to obtain the optical characteristics of low loss. When $a_1/a_2$ is between 0 and 0.7, a loss of about 0.22 dB/km can be obtained.

Consequently, it is preferable that an optical fiber has the refractive index distribution being a complex of the staircase type and the triangular type to obtain low dispersion and low loss.

According to the present invention, the core structure of an optical fiber is controlled, and the optical fiber has the refractive index distribution being a complex of a staircase type having low dispersion and a triangle type having low loss, thus manufacturing an optical fiber having low dispersion and low loss. Also, the triangular refractive index of a large-radius core sensitive to an increase in loss according to micro or macro bending due to center dip is combined with the stepped refractive index of a small-radius core having small bending loss. Thus, bending loss can be reduced.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A dispersion shifted optical fiber, comprising:
    a first core having a constant refractive index $n_1$ within a predetermined radius from a center of an optical fiber;
    a second core covering the first core, the second core having a refractive index which decreases in value from a value of a refractive index of the first core with an increase in radius of the second core in a direction from the center of the optical fiber; and
    a cladding covering the second core, the cladding having a refractive index $n_0$ that is smaller than a minimum refractive index $n_2$ of the second core, whereby $n_0 < n_2 < n_1$, and a dispersion and a dispersion slope for the dispersion shifted optical fiber being adjusted by controlling $n_1$, $n_2$, and a ratio of a first core radius of the first core and a second core radius of the second core to provide a low dispersion and a low dispersion slope for the dispersion shifted optical fiber.

2. The dispersion shifted optical fiber as claimed in claim 1, further comprised of the ratio of the first core radius to the second core radius being in a range of between 0 and 0.7.

3. The dispersion shifted optical fiber as claimed in claim 1, further comprised of a value of an expression: $(R_1-R_2)/R_1$ being in a range of from 0.2 to 0.85, with $R_1$ being a relative refractive index difference of the first core and with $R_2$ being a relative refractive index difference of the second core, and with $R_1$ and $R_2$ each being respectively determined by an expression:

$$(n_{co}^2 - n_{cl}^2)/2n_{co}^2,$$

with $n_{co}$ being a maximum refractive index of the first core when determining $R_1$, with $n_{co}$ being a maximum refractive index of the second core when determining $R_2$, and with $n_{cl}$ being the refractive index of the cladding.

4. The dispersion shifted optical fiber as claimed in claim 1, further comprising a plurality of cores covering the second core, the plurality of cores each respectively having a constant refractive index, with each value of a constant refractive index for each corresponding core of the plurality of cores decreasing with an increase in radius of the plurality of cores in a direction from the center of the optical fiber, and each refractive index of the plurality of cores being smaller than the minimum refractive index $n_2$ of the second core and being greater than the refractive index $n_0$ of the cladding.

5. The dispersion shifted optical fiber as claimed in claim 1, further comprised of a core directly covering the second core having a same refractive index as the minimum refractive index $n_2$ of the second core.

6. The dispersion shifted optical fiber as claimed in claim 5, further comprised of a plurality of cores covering the second core, the plurality of cores each respectively having a value of a refractive index decreases in a staircase shape with an increase in radius of the plurality of cores in a direction from the center of the optical fiber.

7. The dispersion shifted optical fiber as claimed in claim 4, further comprised of the plurality of cores each respectively having a value of refractive index so that a value of a refractive index decreases in a staircase shape with an increase in radius of the plurality of cores in a direction from the center of the optical fiber.

8. A method of forming a dispersion shifted optical fiber, comprising the steps of:
    providing a first core having a constant refractive index $n_1$ within a predetermined radius from a center of an optical fiber;
    covering the first core with a second core having a refractive index which decreases in value from a value of a refractive index of the first core with an increase in radius of the second core in a direction from the center of the optical fiber;
    covering the second core with a cladding having a refractive index $n_0$ that is smaller than a minimum refractive index $n_2$ of the second core, whereby $n_0 < n_2 < n_1$; and
    adjusting a dispersion and a dispersion slope for the dispersion shifted optical fiber by controlling $n_1$, $n_2$, and a ratio of a first core radius of the first core and a second core radius of the second core to provide a low dispersion and a low dispersion slope for the dispersion shifted optical fiber.

9. The method of claim 8, further comprising the step of covering the second core with a plurality of cores each respectively having a constant refractive index, with each value of a constant refractive index for each corresponding core of the plurality of cores decreasing with an increase in radius of the plurality of cores in a direction from the center of the optical fiber, and each refractive index of the plurality of cores being smaller than the minimum refractive index $n_2$ of the second core and being greater than the refractive index $n_0$ of the cladding.

10. The method of claim 8, further comprising the step of directly covering the second core with a core having a same refractive index as the minimum refractive index $n_2$ of the second core.

* * * * *